United States Patent [19]

Steichen et al.

[11] 3,920,334

[45] Nov. 18, 1975

[54] DUAL PURPOSE DETECTOR FOR A LIQUID CHROMATOGRAPH

[75] Inventors: John Carl Steichen; Sydnor H. Bryne, Jr., both of Newark, Del.

[73] Assignee: E. I. Du Pont de Nemours & Co., Wilmington, Del.

[22] Filed: Nov. 13, 1973

[21] Appl. No.: 415,440

[52] U.S. Cl. .................. 356/73; 250/343; 250/345; 356/72; 356/103; 356/205
[51] Int. Cl.² ........................................ G01N 21/00
[58] Field of Search ......... 356/72, 73, 74, 106, 205, 356/103, 104; 250/343, 344, 345, 373; 73/61.1 C

[56] References Cited
UNITED STATES PATENTS

| | | | |
|---|---|---|---|
| 3,010,798 | 11/1961 | Whitehead et al. | 356/73 X |
| 3,292,484 | 12/1966 | Clay | 356/205 |
| 3,390,605 | 7/1968 | Nagamura | 356/73 |
| 3,527,538 | 9/1970 | Allen et al. | 356/205 X |
| 3,734,620 | 5/1973 | Cade | 356/73 |
| 3,788,744 | 1/1974 | Friedman et al. | 356/104 |

*Primary Examiner*—Saxfield Chatmon, Jr.

[57] ABSTRACT

Disclosed herein is a detector, for use in a liquid chromatographic system, which permits the simultaneous measurement of the optical absorbance and fluorescence of the effluent from a liquid chromatographic column.

7 Claims, 3 Drawing Figures

DUAL PURPOSE DETECTOR FOR A LIQUID CHROMATOGRAPH

BACKGROUND OF THE INVENTION

This invention relates to liquid chromatography, and, in particular, to a detector, for use in a liquid chromatographic system, which permits the simultaneous measurement of the optical absorbance and fluorescence of the effluent from a liquid chromatographic column. The terms photoluminescence, fluorescence, and phosphorescence are used interchangeably in this patent.

Both optical absorbance and fluorescence techniques have been used to analyze the constituents of the effluent from a liquid chromatographic column. The intensity of fluorescent light from a sample is proportional to the concentration of the fluorescing constituents of a sample liquid and the exciting light intensity. The exciting light intensity may vary within the sample region due to light absorbance by the sample liquid. The fluorescing constituents of a sample, as well as many of its other components, will contribute to the sample's absorbance. However, comparison concentration measurements can be made if the total deviation of absorbance between samples is less than 0.05 absorbance units. If fluorescence measurements are to be relied upon, these deviations must be kept small. In certain circumstances when the sample contains highly absorbing constituents, particularly highly fluorescent materials, the sample may have to be diluted to decrease its absorbance.

Fluorescence and absorbance measurements are generally most effective over different concentration ranges. In the prior art, separate detectors have been used when the concentration ranges of interest span the effective ranges of both techniques. This is partially because of the interaction between fluorescence and absorbance measurements, particularly the dependence of the fluorescence measurements on absorbance, and also because no one has been able to develop a detection cell in which both measurements can be made effectively.

The present invention relates to a detector, for use in a liquid chromatographic system, which is capable of being used for fluorescence measurement and which has the capability of providing a continual check on the validity of the concentration determinations derived from the fluorescence intensity measurement. The present invention is also capable of being used for simultaneous optical absorbance and fluorescence measurement so that a broader range of concentrations can be measured simultaneously, and so that the concentration of constituents other than those that fluoresce can be measured.

SUMMARY OF THE INVENTION

The above is accomplished by providing a liquid chromatographic system, of the type comprising a chromatographic column, a liquid supply system for the column, and detector means to monitor the constituents of the liquid emerging from the column; in which the detector comprises:

a. a longitudinal flow cell for the liquid emerging from the column, the flow cell having at least one side wall with a portion transparent to fluorescent radiation, and end walls, each of which comprises a window;

b. illuminating means disposed adjacent to a window at one end of said flow cell for passing a beam of radiation through the flow cell, the windows being transparent to the radiation emanating from the illuminating means;

c. monitoring means disposed adjacent to the window at the other end of the flow cell for detecting changes in the intensity of the radiation emerging from the flow cell;

d. fluorescence detector means, disposed relative to the transparent portion of the side wall of the flow cell for detecting fluorescent radiation emanating from within the flow cell.

In the preferred embodiment, the liquid chromatographic system further comprises a reflective housing means to reflect light emanating from within the flow cell to the fluorescence detector means. The reflective housing means is disposed relative to the transparent portions of the side walls of the flow cell, and defines a fluorescence chamber within the flow cell, substantially coextensive with the length of the housing means adjacent to the walls of the flow cell. The fluorescence detector means is normally a photomultiplier, and an emission filter, located between the fluorescence detector and the reflective housing means, is generally provided so that only light of the desired wavelength will reach the fluorescence detector means.

In a still more preferred embodiment, the flow cell comprises a quartz tube and the illuminating means includes two quartz windows located at either end of the flow tube. Sample liquid is introduced into and removed from the flow cell through narrow orifices contained in flow rings disposed at either end of the flow cell between the quartz tube and the quartz windows. Finally, the liquid chromatographic system further comprises a scatter-baffle means disposed outside of and adjacent to the ends of the flow cell to prevent the light which is scattered at the ends of the flow tube and at the windows from entering the fluorescence chamber where it will produce a high fluorescence background signal.

BRIEF DESCRIPTION OF THE DRAWINGS

The present invention can best be described with respect to the following figures in which.

DESCRIPTION OF THE PREFERRED EMBODIMENT

Figure 1:
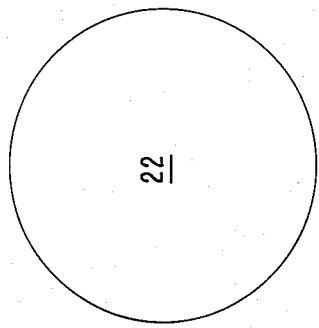
FIG. 1 is a schematic diagram of a generalized liquid chromatographic system.

FIG. 1 shows a generalized schematic diagram of a liquid chromatographic system including: a liquid chromatographic column 11; a liquid supply means 12 for the liquid chromatographic column, which is connected to the column through some sample injection means 13; and a detector 14 for the effluent from the column. The liquid supply means normally comprises a source of liquid plus a pump to force the liquid through the column; and the chromatographic column is generally packed with a chromatographic support material. All of these features, however, are well known to those skilled in the art, and except for the detector and its use in a liquid chromatographic system, they do not comprise part of the present invention.

Figure 2:
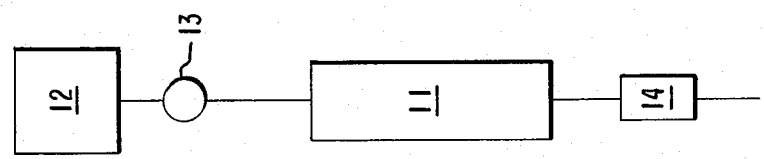
FIG. 2 is a cross-sectional view of one embodiment of the detector of the present invention.

FIG. 2 illustrates one embodiment of the detector means used in the present invention. In this embodiment, the flow cell 40 comprises a quartz tube, 15, two flow rings 16 located at either end of the tube and two quartz windows 18 located at either end of the tube outside the flow rings. Each flow ring contains a narrow inlet 17 through which the effluent from the liquid chromatographic column either enters or leaves the flow cell. The liquid effluent from the chromatographic column is contained in the flow cell by seals 19 and 20 which are compressed by the quartz windows. In the embodiment shown, the cell assembly is symmetrical, but deviations from symmetry are possible.

The incident light beam enters the cell through one of the quartz windows 18 as indicated by the arrow, and passes along the axis of tube 15 through the tube and the flowing sample contained in it, and out the other window. The intensity of the emerging beam is monitored by some monitoring means so that changes in the absorbance of the sample can be measured.

The detector means also includes a reflective housing means 21 which surrounds the quartz tube and, in conjunction with the walls of the tube, defines a fluorescence chamber 28. In the embodiment illustrated, the tube is a quartz tube, and hence is transparent to light along its entire length. Actually, only that portion of the tube adjacent to the reflective housing means need be transparent to the particular radiation used. The reflective housing means has an aperture 27 at the end located away from the tube and a photomultiplier 22 is disposed adjacent to that aperture. An emission filter 24 is disposed between the aperture and the photomultiplier so that only radiation of the desired wavelength will reach the photomultiplier. Finally, the detector includes a pair of scatter baffles 23 which are used to block the light which is scattered at the ends of the flow tube and windows from entering the fluorescence chamber and producing a high fluorescence background signal.

As used in this specification, the entire region within the quartz tube between the quartz windows through which the sample effluent flows is referred to as the flow cell, and the region 50 within the flow cell which is substantially coextensive with the length of the reflective housing means adjacent to the transparent walls of the flow cell is referred to as the fluorescence chamber. To increase the effectiveness of the reflective housing means, that portion of the reflective housing means located away from the photomultiplier is designed to be a reflective surface. In the present embodiment, this reflective surface is conical polished stainless steel surface. This is to insure that light emanating from the flow cell in a direction away from the photomultiplier will be reflected back towards the photomultiplier.

In the embodiment illustrated, flow tube 15 and windows 18 are constructed of quartz, but any material which is transparent to the particular type of radiation used will suffice. Furthermore, the entire flow tube need not be transparent. It is only necessary that that portion of the flow tube adjacent to the fluorescence chamber be transparent to the fluorescent radiation emanating from the fluorescent constituents of the sample medium. The reflective housing means 21 and the scatter-baffles 23 are made from some optically opaque material, such as stainless steel, and the flow rings are generally made from some metal, such as stainless steel, with small holes drilled through them to receive tubes 17. The gaskets 19, and O-rings 20, are made from some elastomeric sealing material well known to those skilled in the art.

There are two salient features in the cell's configuration which should be noted. In order to avoid the transmission of the incident excitation light from one end of the flow tube 15 to the other end through its walls, the aperture 51 in the flow rings 16 should be smaller than the internal diameter of the flow tube. Neglect of this consideration will produce nonlinearity in the optical absorbance measurements at high optical densities. The second point to consider is the length of scatter-baffles 23. These baffles block the light which is scattered at the ends of the flow tube and the windows from entering the fluorescent chamber where it will produce a high fluorescent background signal. As a general consideration, the length of these scatter baffles should be at least about twice the outer diameter of the flow tube.

In order for the cell to be of value in a liquid chromatograph, it must have a small volume; otherwise the liquid chromatograph would have poor resolution. Typical cell dimensions are: total cell length, 2 centimeters; flow tube internal diameter, 1 millimeter; total cell volume, 16 microliters (this is the effective cell volume for sample absorbance); and fluorescence cell volume, 8 microliters (this is the effective cell volume for sample fluorescence).

Figure 3:
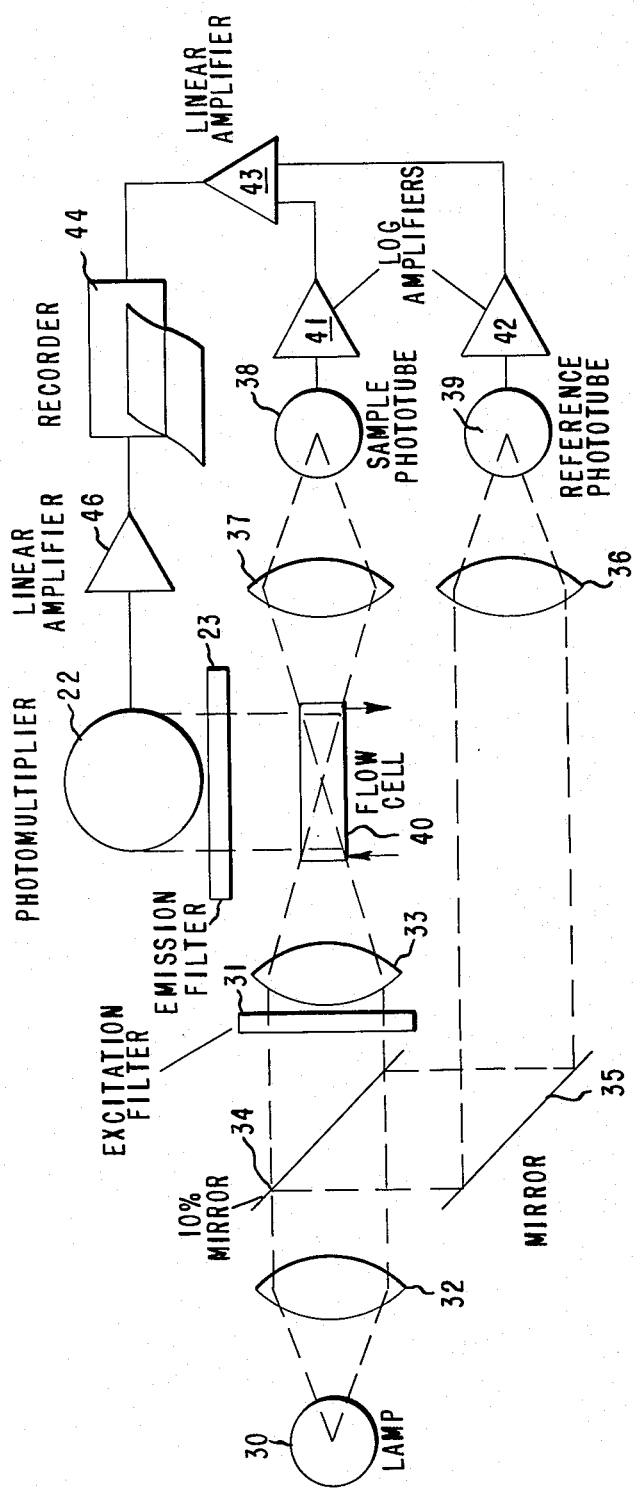
FIG. 3 is a schematic illustration of one embodiment of the absorbance/fluorescence detector system which can be used with the detector of the present invention.

The cell and its relationship to the other components in the detector system is shown in FIG. 3. The light from a lamp, 30, of any appropriate design is filtered by exitation filter 31, and focused on the flow cell by lenses 32 and 33. A small fraction of the light from lamp 30 is focused on a reference photodetector 39 by: a partial silvered mirror 34, located between the lenses 32 and 33; mirror 35; and lens 36. That portion of the light from lamp 30 which is incident on flow cell 40 passes through the flow cell and is focused on the sample phototube, 38, by lens 37. The output of each photodetector is separately amplified by logrithmic amplifiers 41 and 42. The difference in their output is linearly amplified by linear amplifier 43 and recorded by recorder 44. The recorded output is proportional to the concentration of absorbing chromophores in the flow cell. The sample and reference phototubes, the log amplifiers, the linear amplifier and the recorder shown in FIG. 2 are all components well known to those skilled in the art. The calibration, power supply, balancing and range switching circuitry are not shown. These components, however, are also well known to those skilled in the art.

Simultaneously with the optical absorbance measurement, light emitted by the fluorescent compounds in the effluent is passed through emission filter 23 and is detected by photomultiplier 22. The output of the photomultiplier is amplified by linear amplifier 46 and recorded on recorder 44 along with the absorbance signal. The amplitude of the fluorescence signal is proportional to the fluorescent compound concentration in the flow cell.

Simultaneous operation of both the absorbance and the fluorescence system is not required. Each can be operated alone.

In a typical application, the liquid supply 12, the liquid chromatographic column 11, and the sample injection port 13 are provided by a Du Pont Model 841 liquid chromatograph. The detector 14 is a Du Pont Model 835 filter photometer modified for fluorescence detection by the replacement of the existing absorbance flow cell by the dual purpose flow cell, which is part of the invention described in this patent, and the addition of the emission filter 23, photomultiplier 22, linear amplifier 46, and the means to support and contain these items. The lamp is a medium pressure mercury lamp with primary emission at 365 nanometer. Filters 31 and 23 may be absorbance or interference filters, but in this typical case are absorbance filters transmitting respectively 365 nanometer and visible light. The photomultiplier is a Radio Corporation of America 931A, but other types would be acceptable. The linear amplifier 46 includes an Analog Devices AD503J operational amplifier and the appropriate circuitry to provide seventeen ranges of sensitivity. The circuits and components are well known to those skilled in the art. The amplifier output voltage span is 0 to 1 millivolt. Recorder 44 is a two-pen, 1-millivolt, strip chart recorder.

Typical performance characteristics of the detector described above indicates a linear dynamic range of about 10,000 for fluorescence detection, and the optical absorbance detection shows a useful range of from about 0.0006 to about 2.56 absorbance units. A typical fluorescent sample with a quantum efficiency of 0.55 (e.g., quinine in 0.1 N $H_2SO_4$) exhibits a linear dynamic range of $10^6$, using both detectors in overlapping concentration ranges. As indicated, then, the present system has an exceedingly large response range with the fluorescence measurement useful at very low concentrations, and the optical absorbance useful at high concentrations.

What is claimed is:

1. A detector to monitor the constituents of the effluent emerging from a liquid chromatographic column, comprising:
   a. a longitudinal flow cell for the liquid emerging from the column, said flow cell having a longitudinal axis parallel to the path of liquid flow through the flow cell, at least one side wall with a portion transparent to fluorescent radiation, and end walls, each of which comprises a window;
   b. illuminating means disposed adjacent to a window at one end of said flow cell for passing a beam of radiation through said flow cell, said windows being transparent to the radiation emanating from said illuminating means;
   c. monitoring means disposed adjacent to the window at the other end of said flow cell for detecting changes in the intensity of the radiation emerging from said flow cell, said illuminating means and said monitoring means being located on the longitudinal axis of said flow cell; and
   d. fluorescence detector means, disposed relative to the transparent portion of the side wall of said flow cell for detecting fluorescent radiation emanating from within said flow cell.

2. The liquid chromatographic system of claim 1 wherein said fluorescence detector means is a photomultiplier.

3. The liquid chromatographic system of claim 1 further comprising a reflective housing means to reflect light emanating from within said flow cell to said fluorescence detector means, said housing means being disposed relative to the transparent portions of the side wall of said flow cell to define in conjunction therewith a fluorescence chamber in said flow cell.

4. The liquid chromatographic system of claim 3 further comprising an emission filter located between said fluorescence detector means and said reflective housing means to prevent radiation emanating from said illuminating means from reaching said fluorescence detector means.

5. The liquid chromatographic system of claim 1 wherein said flow cell comprises a quartz tube and said windows are quartz windows.

6. The liquid chromatographic system of claim 5 further comprising flow rings disposed between said quartz tube and said quartz windows, each flow ring having a narrow orifice through which liquid is supplied to the flow cell and removed from the flow cell.

7. The liquid chromatographic system of claim 6 further comprising scatter-baffle means, disposed outside of and adjacent to the ends of said flow cell, to prevent any radiation scattered at the ends of said flow cell from entering the fluorescence chamber and producing a high fluorescence background signal.

* * * * *